(12) United States Patent
Racine

(10) Patent No.: US 9,501,415 B1
(45) Date of Patent: Nov. 22, 2016

(54) IMAGE CACHING SYSTEM TO SUPPORT FAST SCROLLING OF IMAGES IN A GRAPHICAL USER INTERFACE

(71) Applicant: Jean-Olivier Racine, Issaquah, WA (US)

(72) Inventor: Jean-Olivier Racine, Issaquah, WA (US)

(73) Assignee: Amazon Technologies, Inc., Reno, NV (US)

( * ) Notice: Subject to any disclaimer, the term of this patent is extended or adjusted under 35 U.S.C. 154(b) by 392 days.

(21) Appl. No.: 13/648,204

(22) Filed: Oct. 9, 2012

(51) Int. Cl.
*G06T 1/60* (2006.01)
*G06F 12/08* (2016.01)

(52) U.S. Cl.
CPC ................................ *G06F 12/0875* (2013.01)

(58) Field of Classification Search
CPC ........... G06F 9/45533; G06F 9/45504; G06F 9/455; G06F 17/30525; G06F 12/0253; H04N 1/812; H04N 7/182; H04N 1/00116
USPC .......... 345/557; 700/784–787; 711/119–140; 715/700
See application file for complete search history.

(56) References Cited

U.S. PATENT DOCUMENTS

| | | | |
|---|---|---|---|
| 7,900,157 B2* | 3/2011 | Takeshima et al. | 715/786 |
| 8,010,679 B2* | 8/2011 | Low et al. | 709/227 |
| 8,121,196 B2* | 2/2012 | Katsavounidis et al. | 375/240.25 |
| 2005/0055663 A1* | 3/2005 | Nijdam | 717/100 |
| 2007/0162528 A1* | 7/2007 | Wright et al. | 707/206 |
| 2008/0187053 A1* | 8/2008 | Zhao et al. | 375/240.25 |
| 2011/0148932 A1* | 6/2011 | Niemi et al. | 345/660 |

* cited by examiner

*Primary Examiner* — Kee M Tung
*Assistant Examiner* — Whitney Pointe
(74) *Attorney, Agent, or Firm* — Lowenstein Sandler LLP

(57) ABSTRACT

A system for image caching is described. The system may include a non-volatile memory to store encoded images, a volatile memory including an image cache, and a processing device to retrieve one or more of the encoded images from the non-volatile memory using a fetching thread, distribute the retrieved images to multiple decoding threads to decode the retrieved images, and store the decoded images in the image cache for use by a rendering application.

21 Claims, 10 Drawing Sheets

IMAGE CACHING SYSTEM TO SUPPORT FAST SCROLLING OF IMAGES IN A GRAPHICAL USER INTERFACE

BACKGROUND

A large and growing population of users employs various mobile devices to view information about various products available on the Internet such as books, movies, electronics, furniture, toys, clothing, accessories and the like. Among these mobile devices are e-book readers (also known as e-readers), cellular telephones, personal digital assistants (PDAs), portable media players, tablet computers, netbooks, and the like.

Many online retailers present information about various products in the form of images (e.g., images of book covers, images of toys, etc.). A user can view images of available or recommended products on a screen of a mobile device, scroll through these images, and then select a specific image to see more details about a respective product. As the quantity of products available on the Internet continues to grow, finding inexpensive and effective ways to allow fast scrolling through a large number of product images on mobile devices continues to be a priority.

BRIEF DESCRIPTION OF THE DRAWINGS

Embodiments of the present disclosure will be understood more fully from the detailed description given below and from the accompanying drawings of various embodiments of the present invention, which, however, should not be taken to limit the present invention to the specific embodiments, but are for explanation and understanding only.

DETAILED DESCRIPTION

Described herein are methods and systems for caching images to support efficient image scrolling in a graphical user interface (GUI) presented on a screen of a mobile device. Images may graphically illustrate products provided or recommended by online retailers or other entities (e.g., individuals, other organizations, etc.) and may include, for example, images of book covers, images of movie covers, images of portable electronic devices, images of furniture items, images of toys, and the like. Alternatively, images may pertain to photographs collected or maintained by a user of the mobile device or other users. The mobile device may be an e-book reader, a cellular telephone, a personal digital assistant (PDA), a portable media player, a tablet computer, a netbook, etc.

A rendering application can allow users to scroll through images displayed on the screen of a mobile device. As a user scrolls through the displayed images, additional images are getting prepared for presentation. Currently, the preparation phase involves several time consuming operations. For example, for rendering applications executed by the Java Virtual Machine (JVM), the preparation phase typically involves loading encoded images into a JVM heap memory, decoding the loaded images and converting the decoded images into image bitmaps. These operations often result in a significant delay in the display of images. In another example, for rendering applications utilizing OpenGL (Open Graphics Library) or other interfaces to interact with video hardware (e.g., a graphics chip or a video card), the preparation phase typically involves loading encoded images into a video-dedicated memory (memory dedicated to a graphics chip or a video card), decoding the loaded images and converting the decoded images into image textures.

Embodiments of the present disclosure overcome the above deficiency by providing an optimized pipeline for decoding outside of the JVM heap memory or the video-dedicated memory and by enabling caching of decoded images in the operating system memory and the JVM heap or video-dedicated memory. Some embodiments of the present disclosure facilitate the reuse of bitmap objects or texture objects, thus reducing time required for the conversion of decoded images into image bitmaps or image textures. In addition, some embodiments of the present disclosure provide a memory mapped file (MMF) cache to persistently store decoded images, which reduces the time for displaying an initial set of images when a rendering application is re-started.

Figure 1:
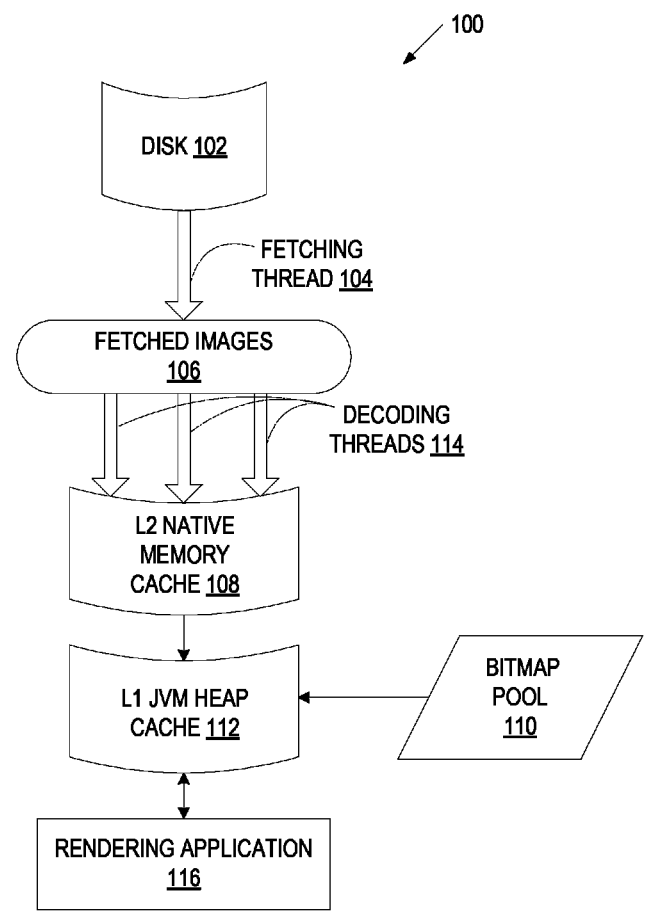
FIG. 1 illustrates the operation of a JVM-based image caching system in accordance with one embodiment of the present disclosure.

FIG. 1 illustrates the operation of a JVM-based image caching system 100 in accordance with one embodiment of the present disclosure. The image caching system 100 includes a level 1 (L1) cache 112 residing in a JVM heap memory and a level 2 (L2) cache 108 residing in a native memory of an operating system. The native memory is a volatile memory controlled by the operating system of the mobile device. A JVM heap memory (also known as the "heap") is a volatile memory controlled by the JVM running on the operating system. The heap can be used for storing objects and objects' data and variables created or initialized by an application 116 at runtime when the application 116 is executed by the JVM. The application 116 can be a rendering application providing a GUI on the screen of the mobile device, where the GUI can present a large number of images (e.g., more than 50 images) and allow a user to scroll through these images, thereby moving new images into a user view in the GUI and moving currently displayed images outside of the user view. The user view is an area in the GUI that is visible to the user. The application 116 can be a Java program, a Python program, a Ruby program or a program in any other language supported by the JVM. The term "JVM," as used herein, refers to any virtual machine that executes applications (e.g., a virtual machine designated for a specific operating system platform or for executing specific applications).

The mobile device includes a disk 102 that stores encoded images (e.g., Joint Photographic Experts Group (JPEG) image files, Portable Network Graphics (PNG) image files, etc.). The disk 102 may be a non-volatile storage device such as a hard disk, a memory card, a flash card or the like. The encoded images may be downloaded to the disk 102 via a network (e.g., from an online retailer or a content provider), from local memory or from a removable storage device (e.g., a USB flash drive). The encoded images may be stored in a cache (e.g., L3 cache not shown in FIG. 1) residing in non-volatile memory of the mobile device.

The rendering application 116 may send a request to load one or more images to the L2 cache 108. The rendering application 116 may send such a request upon invocation or when it detects a user's scrolling command (e.g., a user's gesture to scroll to the right or to the left on a touch screen or a user activation of a scrolling GUI control via a mouse or a similar cursor control device). The rendering application 116 may identify specific images to be loaded (e.g., by their file names). Alternatively, the disk 102 may store the images in a queue in a specific order and the rendering application 116 may specify the number of images to be loaded and/or their position in the queue (e.g., first 5 images in the queue, images 10 through 20 in the queue, etc.). Yet alternatively, the request to load one or more images to the L2 cache 108 may be generated automatically in response to the removal of decoded images from the L2 cache 108. For example, each time a decoded image is removed from the L2 cache 108, a request to load a new image to the L2 cache 108 is generated. In addition or yet alternatively, when the image caching system 100 detects that the execution of the rendering application 116 is starting (e.g., based on a signal received from the rendering application 116), the image caching system 100 may automatically request a predefined number of images to be loaded to the L2 cache 108.

Upon receiving the load request, a fetching thread (e.g., a process or a portion of a process executed by the CPU of the mobile device) 104 may be invoked to start retrieving (fetching) encoded images from the disk 102. Images are fetched sequentially, one after another, and then each fetched image 106 is decoded using a decoding thread 114. Because fetching takes significantly less time than decoding (e.g., fetching may take 2 to 5 milliseconds while decoding may take 60 to 70 milliseconds), the image caching system 100 uses several decoding threads 114 to perform decoding of multiple images in parallel. Each processor or processor core of the mobile device may execute one or more decoding threads 114. The use of multiple decoding threads significantly reduces the time needed to prepare images for presentation by the rendering application 116.

The decoded images are then added to the L2 cache 108. In one embodiment, as decoded images are getting added to the L2 cache 108, the existing images are being removed (evicted) from the L2 cache 108. Alternatively, the existing images are not removed from the L2 cache unless specifically requested by the rendering application 116. For example, the application 116 may send an eviction request and identify decoded images that should be removed from the L2 cache 108.

The L2 cache 108 may include images to be displayed in the user view initially, as well as images that are expected to be displayed in the user view subsequently in response to the user's scrolling operation. For example, the L2 cache 108 may include 8 images that will be displayed in the user view initially, additional 5 images that are expected to be displayed in the user view subsequently if the user scrolls to the right, and 5 other images that are expected to be displayed in the user view if the user scrolls to the left. The L2 cache 108 may include a set of buffers that store the decoded images. As new images are added to the L2 cache 108, the contents of the buffers are replaced with the new images' data. In one embodiment, when the rendering application 116 sends a request to add an image to the L2 cache 108, the rendering application 116 specifies in the request an existing image that should be replaced with the new image. Alternatively, the images are replaced based on the order in which they were added to the L2 cache 108, or based on some other parameter(s).

When the user performs a scrolling operation, the rendering application 116 sends a request to load decoded images to the L1 cache 112. The request may identify specific images to be loaded from the L2 cache 108, or the L2 cache 108 may store decoded images in a specific order and the rendering application 116 may specify the number of images to be loaded and/or the position of images in the L2 cache 108.

In response to the request to load images to the L1 cache 112, the image caching system 100 finds a bitmap object that matches the size of a requested image and uses the found bitmap object to create an image bitmap for the requested image. A bitmap object may be a Java object representing a buffer for storing image data in a format understandable by the rendering application 116. An image bitmap refers to the buffer filled with the image data. The image bitmap inherits parameters of the bitmap object, including, for example, the size (height and width), the number of pixels in a row, the number of rows, etc. The image caching system 100 maintains a pool of bitmap objects 110 for creating image bitmaps for decoded images stored in the L1 cache 108.

In one embodiment, if the image caching system 100 does not find a bitmap object of the matching size in the bitmap object pool 110, the image caching system 100 creates a new bitmap object. In another embodiment, the image caching system 100 uses an existing bitmap object even if its size does not match the size of the requested object. In particular, the image caching system 100 uses a bitmap object of a larger size than the requested image to create an image bitmap for the requested image. The image caching system 100 then fakes the size of the image bitmap (e.g., by changing it to match the size of the image) in order to force the rendering application 116 to only display the portion of the bitmap that has image data in it (e.g., to avoid a black boarder to appear around the image when the image is displayed in the GUI). For example, if the image is 800×800 pixels and the bitmap object is 1000×1000 pixels, the bitmap object will still be used for this image but the size of the image bitmap will artificially (by clipping the edges) be changed to 800×800 pixels, thus reusing an existing bitmap object as opposed to spending time and resources on creating a new bitmap object.

The resulting image bitmaps are then added to the L1 cache 112. In one embodiment, as decoded images are getting added to the L1 cache 112, the existing images are being removed (evicted) from the L1 cache 112. Alternatively, the existing images are not removed from the L1 cache unless specifically requested by the rendering application 116. For example, the application 116 may send an eviction request and identify decoded images that should be removed from the L1 cache 112.

In one embodiment, the image caching system 100 generates a notification each time an image is added to, or removed from, the L2 cache 108 or L1 cache 112. This notification may be generated for the rendering application 116 or any other program or component. In addition, the image caching system 100 may provide a list of images currently stored in the L2 cache 108 and/or a list of image bitmaps stored in the L1 cache 112. These lists can be provided automatically at certain times or in response to a request of the rendering application 116.

In an alternative embodiment (not shown), a rendering application is not a JVM-based application but rather an OpenGL-based application that uses OpenGL to interact with video hardware (e.g., a graphics chip or a video card). An OpenGL-based application operates by retrieving images to be displayed in the GUI from a video-dedicated memory (memory dedicated to a graphics chip or a video card). Hence, in an OpenGL-based image caching system, an L1 cache resides in the video-dedicated memory. Similarly to a JVM-based rendering application, an OpenGL-based application can send a request to load decoded images to the L1 cache from the L2 cache. The L1 cache may use a pool of texture objects, similarly to the bitmap pool 110. A texture object may be an OpenGL object in the form of a buffer for storing image data in a format understandable by the rendering application. An image texture refers to the buffer filled with the image data. The image texture inherits parameters of the texture object, including, for example, the size (height and width), the number of pixels in a row, the number of rows, etc. The image caching system may create a new texture object for an image if the pool does not include a texture object matching the size of the image. Alternatively, the image caching system may use a texture object of a larger size than the image to create an image texture for the image, and fake the size of the image bitmap in order to force the rendering application to only display the portion of the texture that has image data in it.

Figure 2:
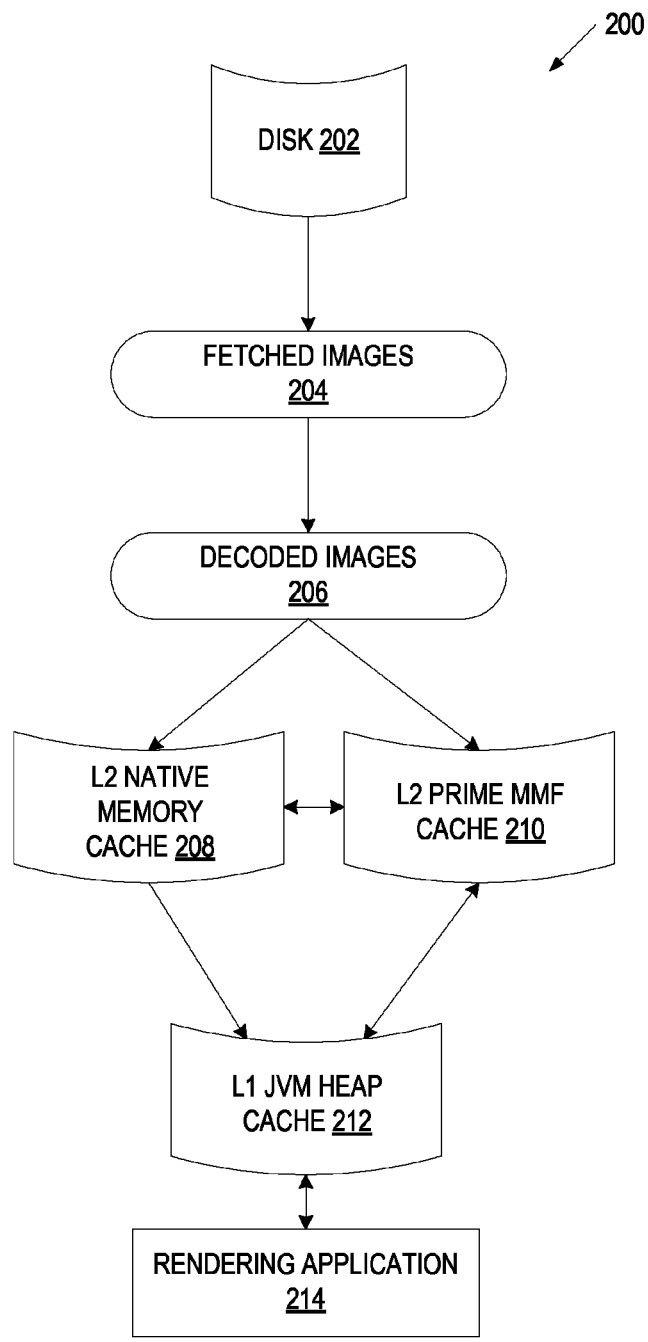
FIG. 2 illustrates the operation of a JVM-based image caching system in accordance with another embodiment of the present disclosure.

FIG. 2 illustrates the operation of a JVM-based image caching system 200 in accordance with another embodiment of the present disclosure. The image caching system 200 includes an L1 cache 212 residing in the JVM heap memory, an L2 cache 208 residing in the native memory of the operating system, and an L2 Prime cache 210 residing in the non-volatile memory of the mobile device (e.g., the hard drive, a memory card, memory mapped file, etc.).

Similarly to the image cache system 100, the image cache system 200 includes a disk 202 that stores encoded images (e.g., JPEG image files, PNG image files, etc.). The rendering application 214 may send a request to load one or more images to the L2 cache 208, or the request to load one or more images to the L2 cache 208 may be generated automatically in response to the removal of decoded images from the L2 cache 208.

Upon receiving the load request, encoded images may be fetched from the disk 202. Fetched images 204 may then be decoded using multiple threads as discussed above. Alternatively, fetched images 204 may be decoded sequentially; one after another (e.g., if the mobile device includes one single-core processor and/or the mobile device does not have sufficient resources for parallel decoding).

The decoded images 206 are then added to the L2 cache 208. In addition, one or more memory mapped files (MMFs) may be created for the decoded images and added to the L2 Prime cache 210. A MMF is a segment of virtual memory which has been assigned a direct correlation with a file-like resource present on-disk. In one embodiment, an MMF is created for a single decoded image. Alternatively, an MMF is created for multiple decoded images. An MMF may be created for decoded images that are displayed by the rendering application 214 upon launch. For example, the L2 Prime cache 210 may include the MMF with the first 10 images that will be displayed by the rendering application 214 initially, and the L2 cache 208 may include the next 15 images that may be displayed by the rendering application 214 when the user scrolls to the left or to the right.

An existing MMF may be removed from the L2 Prime cache when specifically requested by the rendering application 214. For example, the application 214 may send an eviction request and identify an MMF that should be removed from the L2 Prime cache 212. Alternatively, a MMF may be removed from the L2 Prime cache automatically (e.g., after a predefined time interval or in response to a predefined event). In one embodiment, the image caching system 200 generates a notification each time an MMF is added to, or removed from, the L2 Prime cache 210. This notification may be generated for the rendering application 214 or any other program or component. In addition, the image caching system 200 may provide a list of MMFs currently stored in the L2 Prime cache 210. The list can be provided automatically at certain times or in response to a request of the rendering application 214.

When the user performs a scrolling operation, the rendering application 214 sends a request to load images to the L1 cache 212. The request may identify specific images to be loaded from the L2 cache 208 and/or the L2 Prime cache 208, or the L2 cache 208 and/or the L2 Prime cache 208 may store decoded images in a specific order and the rendering application 214 may specify the number of images to be loaded and/or the position of images in the L2 cache 210 and/or the L2 Prime cache 208.

In response to the request to load images to the L1 cache 212, the image caching system 200 may create an image bitmap for each requested image and add the image bitmap to the L1 cache 212. The rendering application 214 may then display these image bitmaps in the user view.

The rendering application 214 may be terminated and then restarted. For example, if the rendering application 214 is no longer running in the foreground (e.g., due to the user launching another application), the rendering application 214 is terminated to free up memory and other computing resources, and the contents of the L1 and L2 caches stored in volatile memory are destroyed. When the user wishes to return to the rendering application 214, the rendering application 214 is restarted. To avoid a time-consuming decoding process for an initial set of images to be displayed upon the application restart, the caching system 200 maintains the L2 Prime cache 210 in the non-volatile memory of the mobile device. As discussed above, the L2 Prime cache 210 stores one or more MMFs files for decoded images. When the rendering application 214 is restarted, it does not need to wait for the fetching and decoding of the initial set of images. Rather, the decoded images can be read from the MMF file(s) stored in the L2 Prime cache 210, and then converted into image bitmaps and added to the L1 cache 212 for use by the rendering application 214. As a result, the time for displaying the initial set of images by the rendering application is significantly reduced.

As discussed above, the L2 Prime cache 210 can include one or more MMFs for a predefined set of decoded images to be displayed initially when the rendering application 214 is launched. Alternatively, the rendering application 214 may instruct the image caching system 200 to create one or more MMFs for a set of images displayed to a user at a certain point of time. For example, when the rendering application 214 is transitioned from an active state to an inactive state (e.g., when a user activates a different application), the rendering application 214 may request the image caching system 200 to add the most recently displayed images to one or more MMFs in the L2 Prime cache 210, thus allowing a user to see the images that had been presented in the user view right before the execution of the rendering application 214 was terminated. The images may be copied to the MMF from the L1 cache 212 or the L2 cache 208. In one embodiment, the request of the rendering application 214 identifies the images to be added to one or more MMFs and specified where these images should be obtained copied from (e.g., the L2 cache 208 or the L1 cache 212).

Figure 3:
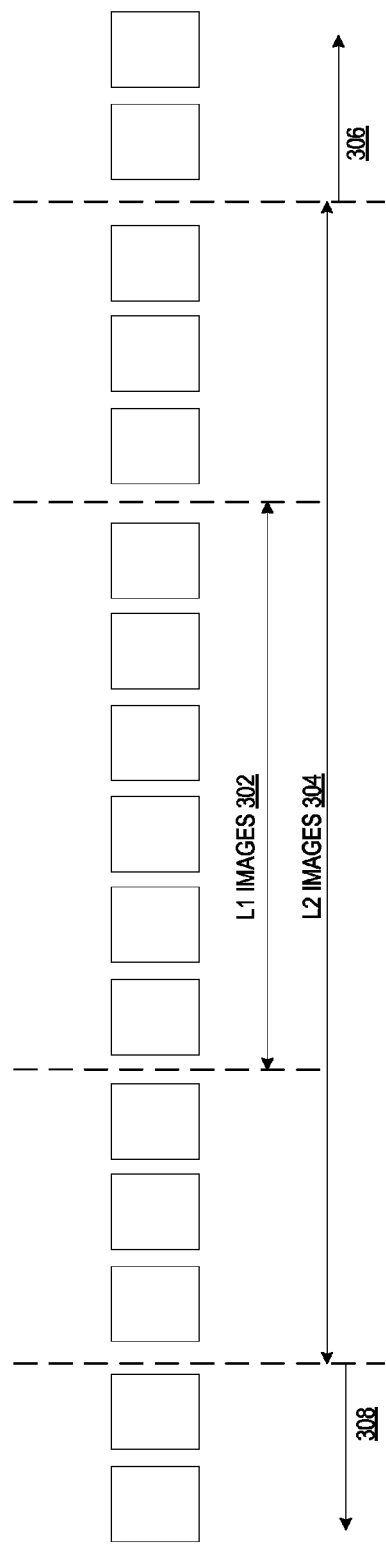
FIG. 3 illustrates caching of images to be presented by a rendering application in accordance with some embodiments of the present disclosure.

FIG. 3 illustrates caching of images and their presentation by a rendering application in accordance with some embodiments of the present disclosure. The rendering application such as rendering application 116 or 214 can present images using, for example, a grid view GUI component or widget, a line view widget, gallery widget, or a carousel widget. The list view widget displays a list of scrollable images. An example of the list view is shown in FIG. 3. The grid view widget displays images in a two-dimensional scrollable grid. The carousel widget displays a three-dimensional (3D) view of scrollable images that can be moved in a circular fashion (resembling a "carousel").

As discussed above, the image caching system 100 or 200 uses L2 native memory cache and L1 cache. Referring to FIG. 3, the L1 cache stores images 302 that are being displayed in the user view of the GUI. The L2 cache stores images 304 to be displayed in the user view, as well as images that are expected to be displayed in the user view if the user scrolls to the left, and images that are expected to be displayed in the user view if the user scrolls to the right. Alternatively, the L2 Prime cache stores images 302 that are initially displayed in the user view, and the L2 cache stores images that are expected to be displayed in the user view if the user scrolls to the left, and images that are expected to be displayed in the user view if the user scrolls to the right. The images that will be subsequently displayed in the user view if the user continues to scroll to the left (as shown by arrow 308) or to the right (as shown by arrow 306) are stored on the disk (e.g., in L3 cache).

Figure 4:
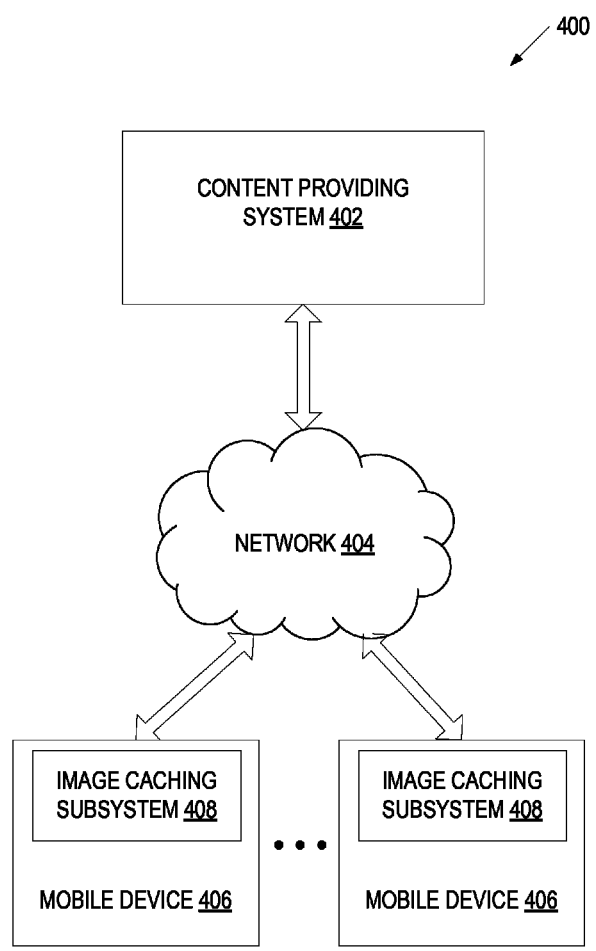
FIG. 4 is a block diagram of an exemplary network architecture in which embodiments of the present disclosure may operate.

FIG. 4 is a block diagram of an exemplary network architecture 400 in which embodiments of the present disclosure may operate. The network architecture 400 may include a content providing system 402 and multiple mobile devices 406 coupled to the content providing system 402 via a network 404 (e.g., a public network such as the Internet, a private network such as a local area network (LAN), or a virtual private network (VPN)).

The mobile devices 406 are variously configured with different functionality to enable consumption of digital content such as electronic documents (e.g., e-books, newspaper articles, etc.), videos (e.g., movies), images (e.g., images of products recommended by online retailers), and the like. The mobile devices 406 may include any type of content rendering devices such as electronic book readers, portable digital assistants, mobile phones, laptop computers, portable media players, tablet computers, cameras, video cameras, netbooks, notebooks, desktop computers, gaming consoles, DVD players, media centers, and the like.

The content providing system 402 provides digital content, upgrades, and/or other information to the mobile devices 406 registered with the content providing system 402 via the network 404. The content providing system 402 also receives various requests, instructions and other data from the mobile devices 406 via the network 404. The content providing system 402 may include one or more machines (e.g., one or more server computer systems, routers, gateways) that have processing and storage capabilities to provide the above functionality.

Communication between the content providing system 402 and a mobile device 406 may be enabled via any communication infrastructure. One example of such an infrastructure includes a combination of a wide area network (WAN) or a VPN and wireless infrastructure, which allows a user to use the mobile device 406 to purchase items and consume items without being tethered to the content providing system 402 via hardwired links. The wireless infrastructure may be provided by a wireless carrier system that can be implemented using various data processing equipment, communication towers, etc. Alternatively, or in addition, the wireless carrier system may rely on satellite technology to exchange information with the mobile device 406. Yet alternatively, or in combination, the wireless infrastructure may be provided by an access point (e.g., WiFi access point) provider system.

In one embodiment, the content providing system 402 periodically sends, to the mobile devices 406, images of products provided or recommended by the content providing system 402 or by other entities (e.g., individuals, other organizations, etc.) and may include, for example, images of book covers, images of movie covers, images of portable electronic devices, images of furniture items, images of toys, and the like. Each mobile device 406 may include a rendering application that displays these images to the user and allows the user to scroll through the images. In one embodiment, the rendering application is executed by the JVM running on the operating system of the mobile device 406.

In addition, each mobile device 406 may host an image caching subsystem 408 that facilitates fast scrolling through images displayed on the screen of the mobile device 406 by the rendering application. In particular, the image caching subsystem 408 provides an optimized pipeline for decoding images outside of the JVM heap memory and enables caching of decoded images in the operating system memory and the JVM heap memory. In some embodiments, the image caching subsystem 408 facilitates the reuse of bitmap objects, thus reducing time required for the conversion of decoded images into image bitmaps. In yet some other embodiment, the image caching subsystem 408 provides a memory mapped file (MMF) cache to store decoded images, which reduces the time for displaying an initial set of images when the rendering application is re-started.

Figure 5:
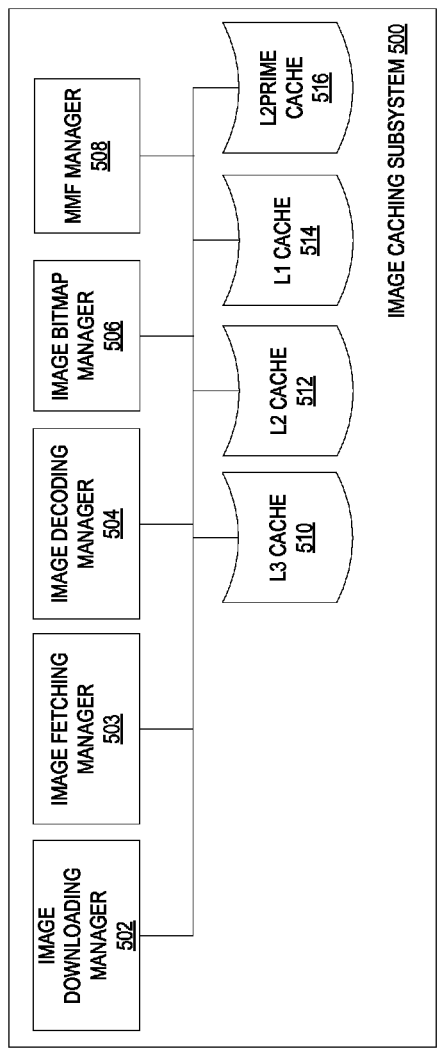
FIG. 5 is a block diagram of one embodiment of an image caching subsystem.

FIG. 5 is a block diagram of one embodiment of an image caching subsystem 500. The image caching subsystem 500 may be the same as the image caching subsystem 408 of FIG. 4. In one embodiment, the image caching subsystem 408 includes an image downloading manager 502, an image fetching manager 503, an image decoding manager 504, an image bitmap manager 506, an MMF manager 508, an L3 image cache 510, an L2 cache 512, an L1 cache 514 and an L2 Prime cache 516. The components of the image caching subsystem 500 may represent modules that can be combined together or separated into further modules, according to some embodiments.

The L3 cache 510 may reside in non-volatile memory (e.g., a hard disk, a memory card, a flash card) of the user device. The image downloading manager 502 may download encoded images to the mobile device via a network (e.g., from a content providing system 402 or other systems) and cache them in the L3 cache 510, or it may copy encoded images from local memory or from a removable storage device (e.g., a USB flash drive) of the mobile device to the L3 cache 510.

The image fetching manager 503 may fetch encoded images from the L3 cache 510 using a fetching thread. The image decoding manager 504 may decode the fetched images, and add the decoded images to the L2 image cache 512. In one embodiment, the image decoding manager 504 uses multiple decoding threads (e.g., one thread per a processor core of the mobile device) to decode fetched images in parallel. Alternatively, the image decoding manager 504 uses a single decoding thread to decode fetched images sequentially. The image decoding manager 504 may decode the encoded images into the RGBA (red green blue alpha) format or the ARGB (alpha green blue) format that defines color components of each pixel (e.g., 32 bits per pixel). Alternatively, the image decoding manager 504 may decode the encoded images into the YUV format that allows reduced bandwidth for chrominance components of a pixel (e.g., 16 bits per pixel), where Y refers to a luminance component of a pixel and UV refer to chrominance components of a pixel. The image decoding manager 504 can also create metadata for each decoded image that may include, for example, the image file name, the size of the image, the number of row in the image, the number of pixels per row, etc.

The L2 cache 512 may reside in the native memory of the operating system of the mobile device and may include images to be displayed by a rendering application in the user view initially, as well as images that are expected to be displayed in the user view subsequently in response to the user's scrolling operation.

When the user performs a scrolling operation, the rendering application may send a request to the image bitmap manager to load decoded images to the L1 cache 514. The request may identify specific images to be loaded from the L2 cache 512. In response to the request to load images to the L1 cache 512, the image bitmap manager 506 may search a pool of existing bitmap objects for a bitmap object that matches the size of a requested image. If the image bitmap manager 506 finds such a bitmap object, it uses the found bitmap object to create an image bitmap for the requested image. If the image bitmap manager 506 does not find a bitmap object of the matching size in the bitmap object pool, the image bitmap manager 506 may create a new bitmap object. In another embodiment, the image bitmap manager 506 uses an existing bitmap object even if its size does not match the size of the requested object. In particular, the image bitmap manager 506 uses a bitmap object of a larger size than the requested image to create an image bitmap for the requested image. The image bitmap manager 506 fakes the size of the image bitmap (e.g., by changing it to match the size of the image) in order to force the rendering application to only display the portion of the bitmap that has image data in it (e.g., to avoid a black boarder to appear around the image when the image is displayed in the GUI). The image bitmap manager 506 adds the resulting image bitmaps to the L1 cache 514 for display by the rendering application.

The MMF manager 508 is responsible for providing an initial set of images when the rendering application is launched or restarted (e.g., after a termination due to inactivity). In particular, when the image decoding manager 504 decodes the images fetched from the L3 image cache 510, it invokes the MMF manager 508 which creates one or more memory mapped files (MMFs) for the decoded images and adds them to the L2 Prime cache 516 that resides in non-volatile memory of the mobile device. In one embodiment, the MMF manager 508 creates an MMF for a single decoded image. Alternatively, the MMF manager 508 creates an MMF for multiple decoded images (e.g., for an initial set of decoded images to be presented by the rendering application). Subsequently, if the rendering application 214 is terminated and then restarted, the MMF manager 508 may read the decoded images from the MMF file(s) stored in the L2 Prime cache 516, and provide them to the image bitmap manager 506 for conversion into image bitmaps. The resulting image bitmaps are then added to the L1 cache 212 for use by the rendering application 214. As a result, the initial set of images does need to go through the decoding process, thus reducing the time needed to display the initial set of images by the rendering application.

In one embodiment, an image processed by the image caching subsystem 500 can be defined as a state machine that transitions from one state to another. For example, the image may initially be in NotLoaded state. Once the image is processed by the image downloading manager 502, the image transitions into L3 state, and then, after being processed by the image fetching manager 503, the image transitions into Fetched state. Next, the image is processed by the image decoding manager 504, causing the image to transition into Decoded state, and then to L2 state. If the image is processed by the MMF manager 508, the image transitions into L2 Prime state. Finally, after being processed by the image bitmap manager 506, the image transitions into L1 state where it is ready for display in the GUI by the rendering application.

Figure 6:
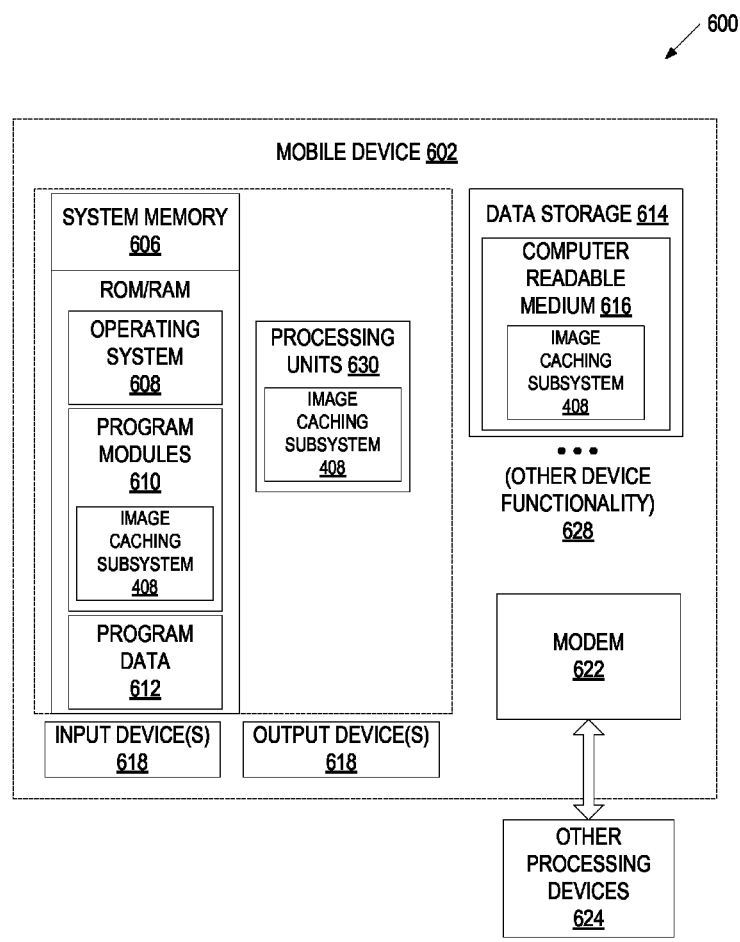
FIG. 6 is a block diagram illustrating an exemplary user device.

FIG. 6 is a block diagram illustrating an exemplary mobile device 600. The mobile device 600 may be the same as mobile device 406 of FIG. 4 and may be any type of computing device such as an electronic book reader, a PDA, a mobile phone, a laptop computer, a portable media player, a tablet computer, a camera, a video camera, a netbook, a desktop computer, a gaming console, a DVD player, a media center, and the like.

The mobile device 600 includes one or more processing units 604, such as one or more CPUs or processor cores. The mobile device 600 also includes system memory 606, which may correspond to any combination of volatile and/or non-volatile storage mechanisms. The system memory 606 may store information which provides an operating system component 608, various program modules 610 including image caching subsystem 408, program data 612, and/or other components. The mobile device 600 performs functions by using the processing unit(s) 604 to execute the image caching subsystem 408 and other instructions provided by the system memory 606. The system memory 606 may also store information that provide a JVM component and a rendering application executed by the JVM, where the rendering application interacts with the image caching subsystem 408 during execution.

The mobile device 600 may also include a data storage device 614 that may consist of one or more types of removable storage and/or one or more types of non-removal storage. The data storage device 614 may include a computer-readable medium 616 on which is stored one or more sets of instructions such as instructions of the image caching subsystem 408 embodying any one or more of the methodologies or functions described herein. As shown, instructions of the image caching subsystem 408 may also reside, completely or at least partially, within the system memory 606 and/or within the processing unit(s) 630 during execution thereof by the user device 600, the system memory 606 and the processing unit(s) 630 also constituting computer-readable media. The instructions of the image caching subsystem 408 may further be transmitted or received over a network. In one embodiment, the L3 cache and the L2 Prime cache of the image caching subsystem 408 reside on the data storage 614.

The mobile device 600 may also include one or more input devices 618 (keyboard, mouse device, specialized selection keys, etc.) and one or more output devices 620 (displays, printers, audio output mechanisms, etc.). The mobile device 600 may further include one or more communication interface mechanisms 622. These communication interface mechanisms 622 allow the user device 600 to interact with other processing devices 624, such as remote computers, the content providing system, and so forth.

The above-enumerated list of modules is representative and is not exhaustive of the types of functions performed by the mobile device 600. As indicated by the label "Other Device Functionality" 628, the mobile device 600 may include additional functions.

FIGS. 7, 8, 9 and 10 are flow diagrams of some embodiments of methods executed by a mobile device. The methods are performed by processing logic that may comprise hardware (circuitry, dedicated logic, etc.), software (such as is run on a general purpose computer system or a dedicated machine), or a combination of both. In one embodiment, the methods are performed by image caching subsystem 406 of FIG. 4.

Figure 7:
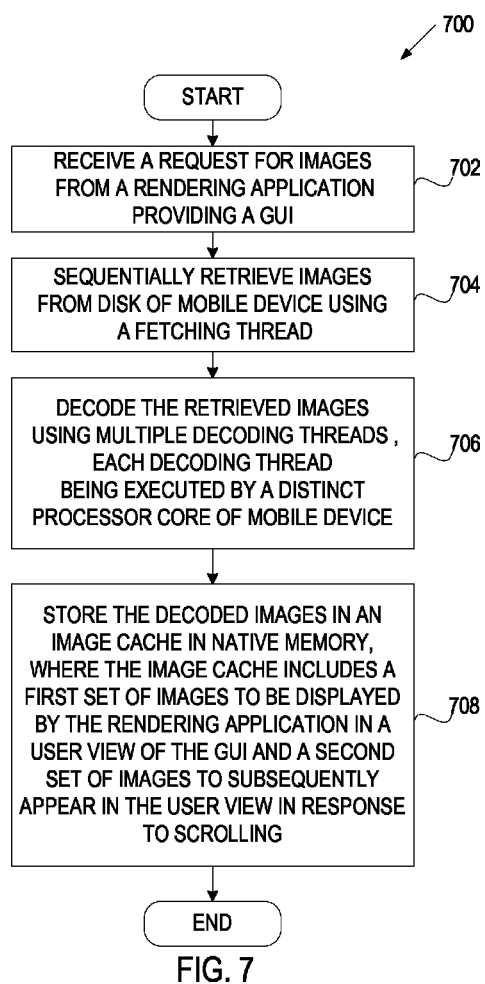
FIG. 7 is a flow diagram of one embodiment of a method for decoding images for presentation in a graphical user interface (GUI) providing image scrolling.

FIG. 7 is a flow diagram of one embodiment of a method 700 for decoding images for presentation in a GUI providing image scrolling. At block 702, the image caching subsystem receives a request for images from a rendering application that provides a GUI for image scrolling. The rendering application may be a JVM-based application or an OpenGL-based application running on the mobile device. The request of the rendering application may identify the images (e.g., by their file names).

At block 704, the image caching subsystem retrieves the requested images from the disk of the mobile device using a fetching thread. The images may be stored on the disk in an encoded file format such as JPEG, PNG, etc. At block 706, the image caching subsystem decodes the retrieved images using multiple decoding threads operating in parallel. Each decoding thread can be executed by a distinct processor core of the mobile device. At block 708, the image caching subsystem stores the decoded images in a first image cache in native memory of the operating system of the mobile device. In one embodiment, the image caching subsystem generates a notification when a decoded image is added to, or removed from the first image cache. A decoded image may be removed from the first image cache upon a request from the rendering application or when a new decoded image is added to the first image cache. In one embodiment, the image caching subsystem provides a list of decoded images currently stored in the first image cache. The list may be provided periodically or in response to a request from the rendering application.

The rendering application may further request that at least some of the decoded images in the first image cache be loaded to a second image cache accessible by the rendering application. The second image cache resides in an application memory that is accessible by the application during execution. Depending on the type of the rendering application, the application memory can be a JVM heap memory, a video dedicated memory, etc.

In response, the image caching subsystem adds the requested images to the second image cache (e.g., as image bitmaps or image textures) where they are used by the rendering application for presentation as scrollable images on the screen of the mobile device.

Figure 8:
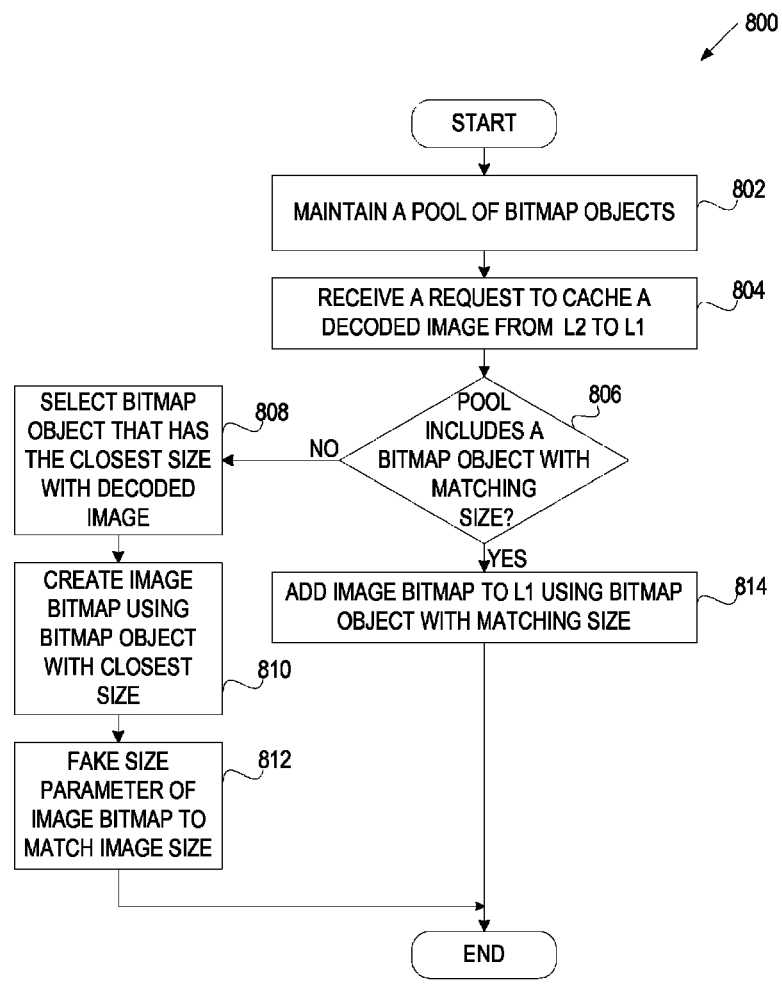
FIG. 8 is a flow diagram of one embodiment of a method for reusing bitmaps for images of varying sizes.

FIG. 8 is a flow diagram of one embodiment of a method 800 for reusing bitmap objects for images of varying sizes. At block 802, the image caching subsystem maintains a pool of bitmap objects. The bitmap objects may be of varying sizes or of the same size (e.g., matching the size of the largest image allowed by the image caching subsystem). In one embodiment, the bitmap objects are buffers created for an initial set of images requested by the rendering application and subsequently reused for additional images.

At block 804, the image caching subsystem receives a request of the rendering application for a decoded image stored in a first image cache (e.g., L2 cache in native memory). In one embodiment, the request identifies the decoded image using an identifier or file name.

At block 806, the image caching subsystem determines whether the image pool includes a bitmap object with the size matching the size of the requested image. If so, the image caching subsystem adds an image bitmap to a second cache (e.g., L1 cache in the JVM heap memory) using the bitmap object (block 816).

If the bitmap object pool does not include a bitmap object with the matching size, the image caching subsystem selects, from the bitmap object pool, a bitmap object with a larger size than the size of the requested image (block 808). In one embodiment, the image caching subsystem looks for the bitmap object that has the closest size to the size of the requested object. In an alternative embodiment, in which all bitmap objects are of the same size, the image caching subsystem selects any bitmap object from the pool (e.g., any bitmap object that does not include image data or a bitmap object that has had current image data longer than other bitmap objects).

At block 810, the image caching subsystem adds an image bitmap for the requested image to the second cache using the selected bitmap object. At block 812, the image caching subsystem artificially changes the size parameter of the created image bitmap to match the size of the image (e.g., by clipping the edges of the image bitmap). The rendering application then accesses the image bitmap and displays it as a scrollable image in the GUI. By faking the size of the image bitmap, only the portion of the image bitmap that has image data is displayed without any black border appearing around the image. As a result, many bitmap objects can be reused without having to create new bitmap objects, thus reducing the time required to convert a decoded image into an image bitmap.

The above mechanism is discussed in the context of a JVM-based image caching subsystem. A similar mechanism can be used for a OpenGL subsystem that uses texture objects and image textures instead of bitmap objects and image bitmaps as discussed above.

Figure 9:
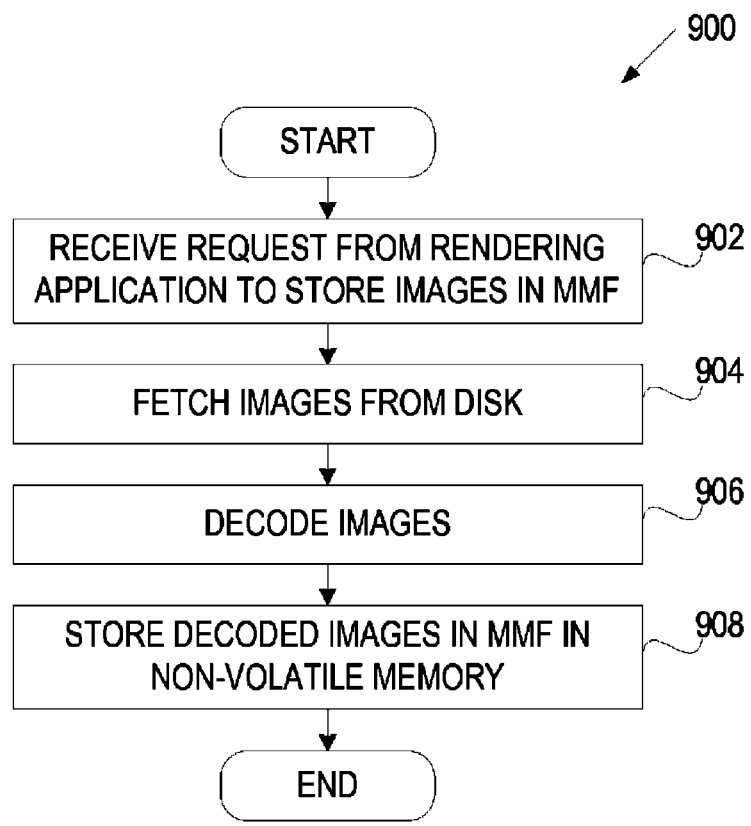
FIG. 9 is a flow diagram of one embodiment of a method for maintaining memory mapped files for images to be presented in a GUI providing image scrolling.

FIG. 9 is a flow diagram of one embodiment of a method 900 for maintaining memory mapped files (MMFs) for images to be presented in a GUI providing image scrolling. At block 902, the image caching subsystem receives a request of a rendering application to store images from disk in one or more MMFs. At block 904, the image caching subsystem fetches encoded images from the disk. At block 906, the image caching subsystem decodes the retrieved images. At block 908, the image caching subsystem adds the decoded images to one or more MMFs in an MMF cache in non-volatile memory. The image caching subsystem may use existing MMFs or create new MMFs for the decoded images.

Figure 10:
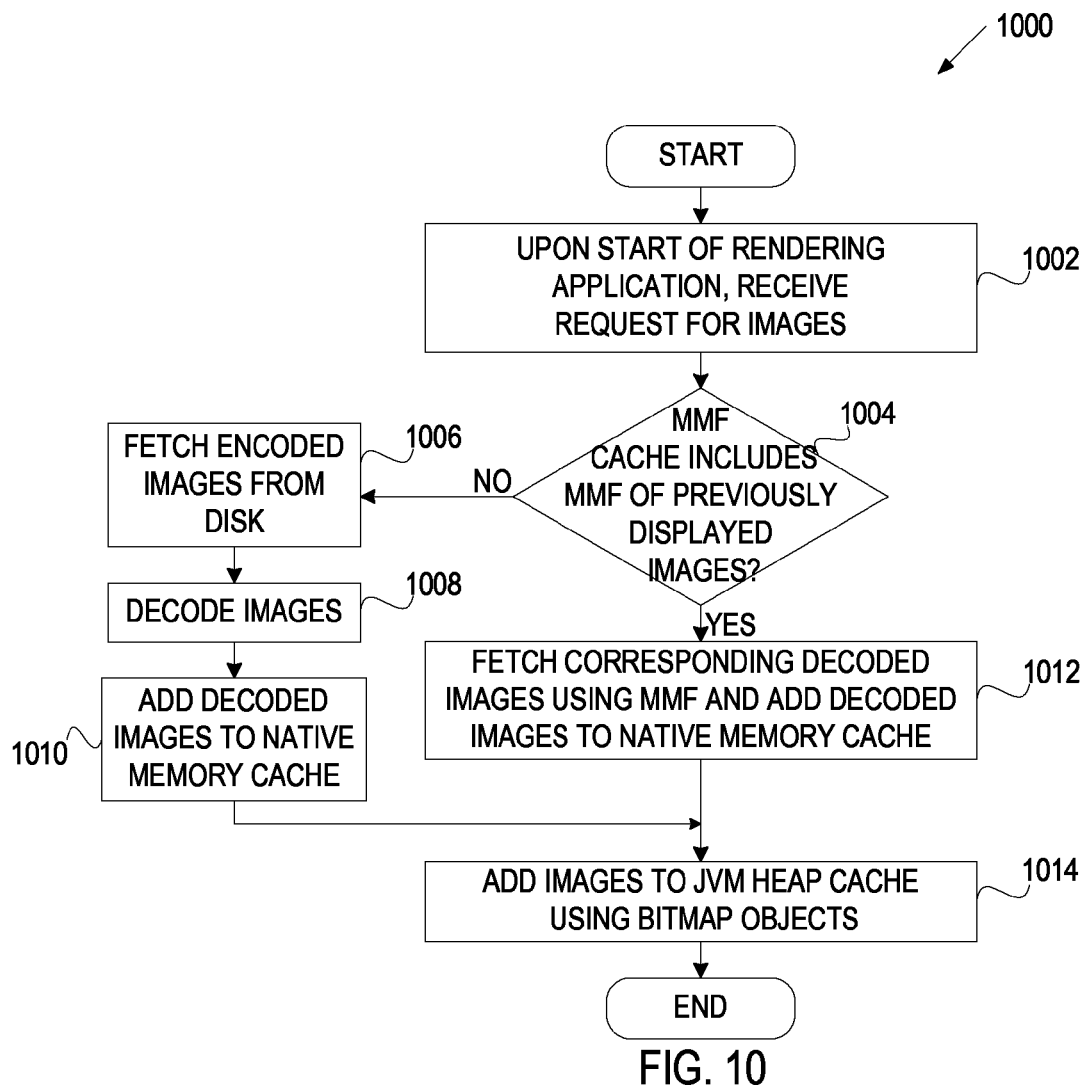
FIG. 10 is a flow diagram of one embodiment of a method for utilizing memory mapped files to reduce a start time of a rendering application providing image scrolling.

In some embodiments, subsequently, the image caching subsystem may receive a request from the rendering application to cache images from the native memory cache or the application memory (e.g., JVM heap memory or video dedicated memory). The image caching subsystem may issue such a request upon the rendering application transitioning into an inactive status (e.g., when moved from foreground to background in response to the launch of another application), and may identify images currently displayed in the user view to allow the user to see the images that the user had most recently seen in the user view right before the execution of the rendering application 214 was terminated. FIG. 10 is a flow diagram of one embodiment of a method 1000 for utilizing memory mapped files (MMFs) to reduce a start time of a rendering application providing image scrolling. Method 1000 starts when the rendering application begins executing (e.g., when it is restarted after previous termination) and is attempting to display an initial set of scrollable images. At block 1002, the image caching subsystem receives a request for images (the initial set of images) from the rendering application. At block 1004, the image caching subsystem determines whether an MMF includes any MMFs of previously decoded images. If so, the image caching subsystem fetches corresponding decoded images using the MMFs, adds the decoded images to the native memory cache (block 1012), and proceeds to block 1014. If not, the image caching subsystem fetches encoded images from the disk (block 1006), decodes the fetched images (block 1008), adds the decoded images to the native memory cache, and proceeds to block 1014.

At block 1014, the image caching subsystem adds the decoded images to a JVM heap cache using bitmap objects. The added images can then be used by the rendering application.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying", "creating", "notifying", "allowing" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   receiving, by a processing device, a request for a plurality of images from a rendering application providing a graphical user interface (GUI) for image scrolling, the rendering application executing in a high level language virtual machine (HLL VM) running on a mobile device;
   sequentially retrieving, by the processing device, the plurality of images from a disk of the mobile device using a fetching thread;
   decoding, by the processing device, the plurality of images using a plurality of decoding threads operating in parallel prior to the plurality of images being stored in a heap memory of the HLL VM, each of the plurality of decoding threads being executed by a distinct one of a plurality of processor cores of the mobile device;
   adding, by the processing device, decoded versions of the plurality of images to a first image cache in a native memory managed by an operating system of the mobile device;
   receiving, by the processing device, a request for a subset of the decoded versions of the plurality of images, the request being issued by the rendering application; and
   adding, by the processing device, the subset of the decoded versions of the plurality of images to a second image cache in the heap memory managed by the HLL VM, the subset of the decoded versions of the plurality of images to be presented by the rendering application in a user view of the GUI, the rendering application to request additional decoded versions of the plurality of images from the first image cache when a user scrolls through images presented in the user view.

2. The method of claim 1 wherein the request for the plurality of images comprises a file name of each of the plurality of images.

3. The method of claim 1 further comprising:
notifying the rendering application in response to adding a decoded version of an image to the first image cache; and
notifying the rendering application in response to adding the decoded version of the image to the second image cache.

4. The method of claim 1 further comprising:
removing one of the decoded versions of the plurality of images from the first image cache or the second image cache in response to a removal request from the rendering application; and
generating a notification indicating that the one of the decoded versions of the plurality of images has been removed from the first image cache or the second image cache.

5. The method of claim 1 further comprising:
providing a list of the decoded versions of the plurality of images in at least one of the first image cache or the second image cache to the rendering application, wherein the first image cache is a level two (L2) cache residing in the native memory of the operating system and the second image cache is a level one (L1) cache residing in the heap memory of the HLL VM.

6. The method of claim 1, wherein adding the decoded versions of the plurality of images to the first image cache comprises adding the decoded versions of the plurality of images to a level two (L2) cache residing in the native memory of the operating system and adding the subset of the decoded versions of the plurality of images to the second image cache comprises adding the subset of the decoded versions of the plurality of images to a level one (L1) cache residing in the heap memory of the HLL VM.

7. A system for a mobile device, comprising:
a non-volatile memory to store a plurality of encoded images;
a volatile memory comprising a native memory managed by an operating system and a heap memory managed by a high level language virtual machine (HLL VM), the volatile memory further comprising a first image cache in the native memory and a second image cache in the heap memory; and
a processing device, coupled to the non-volatile memory and the volatile memory, to:
retrieve one or more of the plurality of encoded images from the non-volatile memory using a fetching thread;
distribute retrieved images to a plurality of decoding threads to decode the retrieved images;
store decoded images in the first image cache prior to the decoded images being stored in the heap memory managed by the HLL VM, the decoded images comprising a first subset of decoded images to be displayed by a rendering application in a user view of a graphical user interface (GUI) supporting image scrolling and a second subset of decoded images expected to subsequently appear in the user view in response to the image scrolling, wherein the rendering application is to execute in the HLL VM; and
store the first subset of decoded images in the second image cache.

8. The system of claim 7 wherein the plurality of encoded images comprise at least one of a Joint Photographic Experts Group (JPEG) image file or a Portable Network Graphics (PNG) image file.

9. The system of claim 7 wherein the processing device is further to receive a request for the one or more of the plurality of encoded images from the rendering application, the request comprising a file name of each of the one or more of the plurality of encoded images.

10. The system of claim 7 wherein the processing device is further to:
remove one of the decoded images from at least one of the first image cache or the second image cache in response to a removal request from the rendering application; and
generate a notification indicating that the one of the decoded images has been removed from at least one of the first image cache or the second image cache.

11. The system of claim 7 wherein the processing device is further to provide a list of the decoded images in the at least one of the first image cache or the second image cache to the rendering application, wherein the second image cache comprises a level one (L1) image cache residing in the heap memory of the HLL VM and the first image cache comprises a level two (L2) image cache residing in the native memory of the operating system.

12. The system of claim 7 wherein the processing device comprises a plurality of processor cores executing the plurality of decoding threads, wherein each of the plurality of decoding threads is executed by a distinct one of the plurality of processor cores.

13. The system of claim 7 wherein the rendering application utilizes an Open Graphics Library (OpenGL) application programming interface (API) to interact with a video card of the mobile device.

14. The system of claim 7, wherein the processing device is further to:
receive a request to load a particular decoded image of the decoded images in the first image cache into the second image cache;
determine a size of the particular decoded image;
determine whether a bitmap object or a texture object having the size is available in an object pool; and
responsive to a determination that no bitmap object or texture object having the size is available in the object pool, use a bitmap object that is larger than the size to create an image bitmap or an image texture for the particular decoded image.

15. The system of claim 14, wherein the processing device is further to:
clip one or more edges of the image bitmap or image texture to cause the image bitmap or image texture to have the size of the particular decoded image; and
display a portion of the image bitmap or image texture that has image data without displaying the one or more clipped edges of the image bitmap or image texture that lack image data.

16. A non-transitory computer readable storage medium including instructions that, when executed by a processing device, cause the processing device to perform operations comprising:
receiving, by the processing device, a request for a plurality of images from a rendering application running on a mobile device;
retrieving, by the processing device, the plurality of images from a non-volatile memory of the mobile device for decoding;

storing, by the processing device, a first subset of decoded images in a first image cache in a volatile memory of the mobile device;

storing, by the processing device, a second subset of the decoded images in a memory mapped file (MMF) in a second image cache in the non-volatile memory of the mobile device;

storing, by the processing device, the second subset of the decoded images from the second image cache in a third image cache in the volatile memory of the mobile device, wherein the rendering application is to display the second subset of the decoded images in a user view of a user interface; and responsive to a user scrolling through the second subset of the decoded images in the user view, storing, by the processing device, the first subset of the decoded images from the first image cache in the third image cache, wherein the rendering application is to display the first subset of the decoded images in the user view.

17. The non-transitory computer readable storage medium of claim 16 wherein the operations further comprise:

responsive to the rendering application transitioning to an inactive state, adding the first subset of the decoded images in the first image cache to the MMF in the second image cache.

18. The non-transitory computer readable storage medium of claim 16 wherein the operations further comprise:

responsive to a restart of the rendering application, adding current images stored in the MMF to the third image cache for display by the rendering application in the user view.

19. The non-transitory computer readable storage medium of claim 16 wherein the first image cache is a level two (L2) cache residing in native memory of an operating system, and wherein the third image cache is a level one (L1) cache residing in a video-dedicated memory.

20. The non-transitory computer readable storage medium of claim 16 wherein the third image cache is located in an application memory accessible to the rendering application during execution, wherein the application memory is a heap memory or a memory dedicated to a video card.

21. The non-transitory computer readable storage medium of claim 16 wherein storing the second subset of the decoded images to the MMF in the second cache comprises:

responsive to the rendering application transitioning to an inactive state, adding the second subset of the decoded images in the third image cache to the MMF in the second image cache.

* * * * *